United States Patent
Rahm et al.

(10) Patent No.: US 11,346,309 B2
(45) Date of Patent: *May 31, 2022

(54) METHOD FOR OPERATING AN INTERNAL COMBUSTION ENGINE SYSTEM

(71) Applicant: VOLVO TRUCK CORPORATION, Gothenburg (SE)

(72) Inventors: Fredrik Rahm, Hörby (SE); Johan Carlén Andersson, Lund (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/270,309

(22) PCT Filed: Aug. 23, 2018

(86) PCT No.: PCT/EP2018/072724
§ 371 (c)(1),
(2) Date: Feb. 22, 2021

(87) PCT Pub. No.: WO2020/038576
PCT Pub. Date: Feb. 27, 2020

(65) Prior Publication Data
US 2021/0180533 A1    Jun. 17, 2021

(51) Int. Cl.
*F02M 26/50*    (2016.01)
*F02M 26/33*    (2016.01)
(Continued)

(52) U.S. Cl.
CPC ......... *F02M 26/50* (2016.02); *F02D 41/0055* (2013.01); *F02D 41/06* (2013.01);
(Continued)

(58) Field of Classification Search
None
See application file for complete search history.

(56) References Cited

U.S. PATENT DOCUMENTS 3,774,399 A * 11/1973 Nohira .................... F02D 21/08
60/297
4,467,774 A * 8/1984 Becker .................. F02M 26/50
60/319
(Continued)

FOREIGN PATENT DOCUMENTS

DE    102006000490 A1    5/2007
DE    102017102487 A1 *  8/2017 ............. F02M 26/34
(Continued)

OTHER PUBLICATIONS

International Search Report and Written Opinion dated May 28, 2019 in corresponding International PCT Application No. PCT/EP2018/072724, 8 pages.

*Primary Examiner* — Kevin R Steckbauer
(74) *Attorney, Agent, or Firm* — Venable LLP; Jeffri A. Kaminski

(57) ABSTRACT

The invention relates to a method for operating an internal combustion engine system (2), wherein the internal combustion engine system (2) is provided with an air intake duct (3), an exhaust gas duct (4) and an exhaust gas recirculation (EGR) system (5), wherein the EGR system (5) comprises an EGR conduit (6) that fluidly connects the exhaust duct (4) and the intake duct (3), and wherein a gas feeding device (7) configured to feed exhaust gas from the exhaust duct (4) to the intake duct (3) is arranged in the EGR conduit (6). The method is characterized in that it comprises the step of: detecting an indication of accumulated deposits of soot, hydrocarbons or other contaminants in the gas feeding device (7) by determining whether a rotational friction of a rotary member (71, 72) of the gas feeding device (7) exceeds a threshold value. The invention also relates to an internal combustion engine system (2) configured for being operated by such a method and to a vehicle (1) provided with such an
(Continued)

engine system (2). The invention further relates to means for controlling the above method.

14 Claims, 3 Drawing Sheets

(51) Int. Cl.
    *F02M 26/34*     (2016.01)
    *F02M 26/35*     (2016.01)
    *F02M 26/36*     (2016.01)
    *F02M 26/49*     (2016.01)
    *F02D 41/06*     (2006.01)
    *F02D 41/22*     (2006.01)
    *F02D 41/00*     (2006.01)

(52) U.S. Cl.
    CPC ............ *F02D 41/22* (2013.01); *F02M 26/33* (2016.02); *F02M 26/34* (2016.02); *F02M 26/35* (2016.02); *F02M 26/36* (2016.02); *F02M 26/49* (2016.02)

(56) References Cited

U.S. PATENT DOCUMENTS

| | | | | |
|---|---|---|---|---|
| 6,435,166 B1* | 8/2002 | Sato | ...... | F02M 26/05 123/568.21 |
| 6,659,090 B2* | 12/2003 | Sisken | ...... | F02M 26/36 123/568.21 |
| 6,904,898 B1* | 6/2005 | Sahlen | ...... | F02M 26/47 60/605.2 |
| 7,131,263 B1* | 11/2006 | Styles | ...... | F02M 26/35 60/297 |
| 7,302,795 B2* | 12/2007 | Vetrovec | ...... | F02B 37/00 60/309 |
| 7,490,462 B2* | 2/2009 | Roozenboom | ...... | F02M 26/15 123/562 |
| 7,971,577 B2* | 7/2011 | Styles | ...... | F02M 26/28 123/568.12 |
| 8,725,386 B2* | 5/2014 | Khair | ...... | F02M 26/33 73/114.74 |
| 8,903,631 B2* | 12/2014 | Klingbeil | ...... | F02D 41/0055 123/676 |
| 9,581,114 B2* | 2/2017 | Hilditch | ...... | F02D 41/0065 |
| 9,828,955 B2* | 11/2017 | Hilditch | ...... | F02D 41/1475 |
| 10,125,727 B2* | 11/2018 | Hayashi | ...... | F02B 37/162 |
| 10,359,012 B2* | 7/2019 | Kikuchi | ...... | F02M 26/22 |
| 2003/0127077 A1* | 7/2003 | Sisken | ...... | F02M 26/50 123/568.11 |
| 2003/0213230 A1* | 11/2003 | Yahata | ...... | F02D 41/021 60/320 |
| 2007/0006571 A1* | 1/2007 | Vetrovec | ...... | F02M 25/12 60/281 |
| 2007/0137590 A1* | 6/2007 | Vetrovec | ...... | F02B 37/00 60/320 |
| 2007/0193270 A1* | 8/2007 | Roozenboom | ...... | F02M 26/08 60/605.1 |
| 2008/0017175 A1* | 1/2008 | Kondo | ...... | F01N 13/0097 700/274 |
| 2008/0264609 A1* | 10/2008 | Lutz | ...... | F02M 26/32 165/104.19 |
| 2010/0058748 A1* | 3/2010 | Styles | ...... | F02M 26/50 123/568.12 |
| 2010/0242929 A1* | 9/2010 | Kardos | ...... | F02M 26/05 123/568.12 |
| 2012/0323465 A1* | 12/2012 | Peters | ...... | F02M 26/43 701/104 |
| 2012/0323470 A1* | 12/2012 | Klingbeil | ...... | F02D 41/405 701/108 |
| 2016/0131088 A1* | 5/2016 | Styles | ...... | F02M 26/04 123/568.12 |
| 2017/0101968 A1* | 4/2017 | Hayashi | ...... | F02M 35/10157 |
| 2017/0342949 A1* | 11/2017 | Kikuchi | ...... | F02M 26/50 |
| 2018/0163675 A1* | 6/2018 | Oshita | ...... | F02M 26/53 |
| 2020/0040852 A1* | 2/2020 | Ueda | ...... | F02M 26/74 |
| 2020/0240370 A1* | 7/2020 | Kroon | ...... | F02M 26/17 |
| 2021/0071664 A1* | 3/2021 | Hughes | ...... | F04C 29/005 |
| 2021/0071667 A1* | 3/2021 | Hughes | ...... | F04C 18/14 |
| 2021/0180533 A1* | 6/2021 | Rahm | ...... | F02M 26/33 |
| 2021/0180545 A1* | 6/2021 | Rahm | ...... | F02D 41/062 |
| 2021/0215123 A1* | 7/2021 | Ueda | ...... | F02M 26/28 |
| 2021/0310448 A1* | 10/2021 | Rahm | ...... | F02D 41/0052 |

FOREIGN PATENT DOCUMENTS

| | | | | |
|---|---|---|---|---|
| FR | 2833653 A1 | | 6/2003 | |
| JP | 10306719 A | * | 11/1998 | ............ F02M 26/35 |
| JP | 2009121476 A | * | 6/2009 | ............... F02C 3/34 |
| WO | WO-2014045578 A1 | * | 3/2014 | ............ B01D 47/06 |
| WO | WO-2019141767 A2 | * | 7/2019 | ............ F02M 26/34 |
| WO | WO-2019141767 A3 | * | 8/2019 | ............ F02M 26/34 |
| WO | WO-2020038576 A1 | * | 2/2020 | ........ F02D 41/0055 |
| WO | WO-2020120614 A2 | * | 6/2020 | ........ F02D 41/0065 |

* cited by examiner

METHOD FOR OPERATING AN INTERNAL COMBUSTION ENGINE SYSTEM

CROSS-REFERENCE TO RELATED APPLICATIONS

This application is a U.S. National Stage application of PCT/EP2018/072724, filed Aug. 23, 2018, and published on Feb. 27, 2020, as WO 2020/038576 A1, all of which is hereby incorporated by reference in its entirety.

TECHNICAL FIELD

The invention relates to a method for operating an internal combustion engine system provided with e.g. an EGR system and a gas feeding device for feeding exhaust gas in the EGR system. The invention also relates to an internal combustion engine system, a vehicle and controlling devices for controlling the above method.

The invention can typically be applied in heavy-duty vehicles, such as trucks, buses and construction equipment, but can also be applied in other types of applications and in other types of vehicles and vessels. Although the invention will be described with respect to a truck, the invention is not restricted to this particular vehicle.

BACKGROUND

EGR (Exhaust Gas Recirculation) is a well-known means for reducing the amounts of nitrogen oxide (NOx) in the exhaust gas of internal combustion engines, for instance diesel engines arranged for propulsion of vehicles, such as trucks. A part of the exhaust gas is recirculated to the intake side of the engine, which lowers the maximum combustion temperature in the engine and reduces the production of NOx.

An EGR system can be arranged in different ways but includes at least some form of EGR channel that fluidly connects the exhaust side and the intake side of the engine. Commonly, an EGR system includes an EGR flow control valve and an EGR cooler.

Control of the EGR flow in EGR systems is associated with various challenges, such as fluctuating intake and exhaust pressures, hardware durability problems due to high exhaust gas temperatures and soot deposition, condensation and corrosion in EGR cooler, etc. A further challenge is that during certain operational conditions in many engine systems, and during most of the time for certain engine systems provided with an efficient turbo arrangement, the pressure at the intake side is higher than at the exhaust side so there is no driving force for recirculating the exhaust gas.

To overcome the challenge related to a higher pressure at the intake side than at the exhaust side U.S. Pat. No. 6,435,166 proposes the use of a gas feeder (an EGR pump/compressor) for feeding gas from the exhaust side to the intake side. Although such a gas feeder seems to solve the intended problem this solution is rare on commercial engines, possibly due to durability problems.

Alternative ways of dealing with a higher pressure at the intake side is to make use of a variable geometry turbo (VGT) arrangement for controlling the exhaust gas pressure (i.e. for keeping the exhaust gas pressure sufficiently high). A drawback of such a VGT arrangement is a fuel consumption penalty related to the increased exhaust back pressure. Another way is to supply EGR into the intake duct via a venturi nozzle. A drawback of venturis is that they are typically associated with a significant loss in pressure, in particular for large flows of gas. A further way is to generate a pulsed EGR flow by arranging a non-return valve in the EGR conduit that provides for a flow towards the intake side each time there is pulse of exhaust gas but where return flow between the pulses is prevented. A drawback related to pulsed EGR flow is difficulties in controlling the flow.

There is thus a need for an EGR system that provides for an effective and reliable recirculation of exhaust gas also when the pressure is higher on the intake side than on the exhaust side.

SUMMARY

An object of the invention is to provide a method and a device, which method/device provides for, compared to known methods and devices, a more effective and reliable recirculation of exhaust gas in an internal combustion engine system when the pressure is higher on the intake side than on the exhaust side.

According to a first aspect of the invention, the object is achieved by a method according to claim 1. According to a second aspect of the invention, the object is achieved by a device (engine system and vehicle) according to the independent device claim. According to a further aspect of the invention, the object is achieved by a computer-related product/medium or a control unit for controlling the method.

The method relates to a method for operating an internal combustion engine system, wherein the internal combustion engine system is provided with an air intake duct, an exhaust gas duct and an exhaust gas recirculation (EGR) system, wherein the EGR system comprises an EGR conduit that fluidly connects the exhaust duct and the intake duct, and wherein a gas feeding device configured to feed exhaust gas from the exhaust duct to the intake duct is arranged in the EGR conduit.

The method is characterized in that it comprises the step of: detecting an indication of accumulated deposits of soot, hydrocarbons or other contaminants in the gas feeding device by determining whether a rotational friction of a rotary member of the gas feeding device exceeds a threshold value.

Typically, various material will gradually accumulate in a gap between the rotary member and a stationary part of the gas feeding device during operation of the engine system. The gas feeding device may, for instance, be a displacement pump of a Roots blower type having a pair of rotors provided with meshing lobes where there is a small gap between the lobes and the surrounding housing. When the gap starts to get closed by the deposited material it will gradually increase the rotational friction of the rotary member. At some point, or directly at start if the rotary member has got stuck, the rotational friction will be above the threshold value. The method thus provides an indication on whether the gas feeding device needs to be cleaned or in some other way does not function as intended. As further described below, various options are available in case such an indication is provided, such as rotating the rotary member back and forth, cleaning the gas feeding device with a flushing liquid, or by-passing the gas feeding device to allow continued operation of the engine system even if the gas feeding device has got stuck or does not work for other reasons.

The method thus provides for an effective and reliable recirculation of exhaust gas, in particular in an internal combustion engine system where the pressure is higher on the intake side than on the exhaust side, in that the method provides an indication on various durability problems related to gas feeding devices used for feeding recirculated exhaust gas; the method thus provides the possibility to eliminate, reduce or in some other way handle such problems at an early stage. In short, the method makes EGR gas feeding devices of interest for commercial engines.

The method can be carried out during normal operation of the engine system, during start-up of the engine system (cold start) or when the "engine parts" (pistons, valves, turbo arrangement, etc.) of the engine system is not in operation.

The gas feeding device may comprise one or more rotary members and the rotational friction may be determined for one or more of the rotary members.

In an embodiment the determination of the rotational friction comprises one or more of the following steps:
 measuring a torque applied to the rotary member;
 measuring a driving power, such as a drive motor current, of a drive source arranged to drive the gas feeding device and rotate the rotary member;
 measuring an actual rotational speed of the rotary member; and/or
 measuring a response time of the rotary member between a change in driving power and a resulting change of rotational speed.

The rotational friction can thus be determined indirectly from different measurements and calculations and combinations thereof.

In an embodiment, in case an indication of accumulated deposits is detected, the method further comprises the step of: operating the rotary member in a reversed rotational direction, opposite to a rotational direction used under normal operational conditions. Changing the rotational direction can make the deposits come loose from the gas feeding device.

In an embodiment the rotary member is operated in the reversed rotational direction in a pulsed manner during a short period, wherein the pulsed reversed operation is followed by continued operation in the normal operational rotational direction. Firstly, operating the rotary member in the reversed direction only for a short time period is typically sufficient for removing the deposits. Secondly, reversing the direction only for a short time period does not have any significant effect on the general operation of the engine system (i.e. in case the engine system is in general operation; the gas feeding device can be operated in any direction also when the engine system is not in general operation and no exhaust gas is produced etc.). Preferably, the short period during which the rotary member is operated in the reversed direction is less than 10 s, preferably less than 5 s. The step of operating, in a pulsed manner, the rotary member in a reversed rotational direction may be repeated. As an alternative or combination, the method may comprise the step of operating the rotary member in a pulsed manner alternately in the reverse rotational direction and the normal rotational direction. This includes various variants where the rotary member is operated in the same direction two or more times in a row before changing direction.

In an embodiment, in case an indication of accumulated deposits is detected, the method further comprises the step of: increasing a drive power of a drive motor arranged to drive the gas feeding device and the rotary member to a power level higher than a power level used under normal operational conditions. This may result in that the deposits come loose and can be used in combination with or as an alternative to operating the rotary member in the reversed direction.

In an embodiment, in case an indication of accumulated deposits is detected, the method further comprises the step of: guiding the flow of exhaust gas in the EGR conduit in a bypass conduit arranged in fluid communication with the EGR conduit upstream and downstream of the gas feeding device. This can be used as a form of emergency solution when the rotary member has got stuck or the gas feeding device does not work at all for other reasons. The engine system can thereby still operate so the vehicle can still be used and does not need any immediate towing/rescuing. An engine break or variable geometry turbo may be arranged to increase the pressure in the exhaust duct so as to provide a drive for the EGR flow without the gas feeding device. Also an inlet throttle valve can be used to provide the EGR drive.

In an embodiment, in case an indication of accumulated deposits is detected, the method further comprises the step of: increasing the temperature of the exhaust gas flowing through the gas feeding device. This is useful for burning off hydrocarbons (fuel and oil residues) that might have accumulated in the gas feeding device. The temperature of the exhaust gas in the EGR conduit may be increased to around 120° C. or even up to around 150° C. for an efficient removal of hydrocarbons.

To increase the temperature of the exhaust gas flowing through the gas feeding device the method may comprise the step of: operating the internal combustion engine system so as to increase the temperature of the exhaust gas and/or reducing a cooling effect of an EGR cooling device arranged in the EGR conduit upstream of the gas feeding device. Reducing the cooling effect of the EGR cooling device includes e.g. turning the cooler off and making use of an EGR cooler by-pass channel.

In an embodiment, in case an indication of accumulated deposits is detected, the method further comprises the step of: providing a flushing liquid in the EGR conduit upstream of the gas feeding device so as to flush and clean the gas feeding device. The flushing/washing liquid will thus follow the EGR flow towards and into the gas feeding device where it will clean the gas feeding device by removing soot and other accumulated deposits from parts of the gas feeding device that are in contact with the EGR flow during operation of the engine system. Such flushing/cleaning may be used in combination with rotating the rotary member back and forth as well as with the other measures mentioned above.

Besides that such flushing/cleaning has the potential of removing accumulated deposits that cause the increased rotational friction of the rotary member, it safeguards function and reduces sticking risk etc. of the gas feeding device and is useful also for reducing performance variation and for allowing the use of smaller tolerances that can be used to improve the efficiency of the gas feeding device, such as the use of smaller gaps in a displacement pump of e.g. a Roots blower type. The flushing/cleaning operation may therefore be carried out also without a preceding step of detecting any indication of accumulated deposits; the flushing/cleaning can be carried on a routine basis and/or for preventive purposes to prevent significant accumulation of deposits.

Providing a liquid in the EGR conduit is contradictory to conventional safeguarding of EGR systems because measures are normally taken to avoid introduction or production (condensation) of liquids in the EGR system as this may result in corrosion or other damages. In addition, providing a liquid in a conduit upstream of a feeding device intended to feed gas, and not liquid, is generally also avoided as a precautionary measure.

Typically, the flushing liquid is water or a water-based liquid but may be e.g. an alcohol or an alcohol-water mixture or other type of liquid that may be stored in a separate tank.

In principal, a portion of flushing liquid introduced into the EGR conduit may be in gas form before and/or during introduction, it could for instance be steam, but when the flushing liquid/fluid comes in contact with the gas feeding device it should be in liquid form to exhibit more efficient cleaning properties. The use of a flushing liquid that is in liquid form also before and during introduction into the EGR conduit is likely to be more efficient.

The amount of flushing liquid to be used in one flushing/cleaning step can be varied and may be adapted to, for instance, the size of the EGR conduit (which in turn may depend on the size of the engine), the current and earlier operational condition of the engine, and the time passed since the last flushing operation. The flushing operation may be allowed to continue for some time and may be repeated.

In an embodiment the method further comprises the steps of: condensing exhaust gas in or downstream an EGR cooling device arranged in association with the EGR conduit so as to form an EGR condensate, and using the EGR condensate as the flushing liquid. This is an efficient way of providing the flushing liquid since an EGR cooler capable of producing condensate normally is included in the system anyway. If the EGR cooling device is arranged upstream of the EGR gas feeding device the exhaust that is condensed in the cooling device or in the conduit between the cooling device and the gas feeding device is thus provided upstream of the gas feeding device. No additional hardware is required in such a case. The EGR conduit may, however, be designed to have a particular effect on the condensation, for instance by forming passages that enhances condensation at certain locations etc. If the cooling device is arranged downstream the gas feeding device a channel (and a valve) may be arranged for directing the condensate back to the EGR conduit upstream of the gas feeding device. Irrespectively of the relative flow order of the cooling device and the gas feeding device some sort of tank may be arranged for accumulating condensed exhaust gas and form a flush liquid supply. A channel may be arranged for guiding the condensate from such an accumulator tank in a controllable way to an inlet to the EGR conduit upstream of the EGR gas feeding device.

The engine system is typically operated to avoid or minimize condensation in the EGR. In an embodiment the engine system is controlled to produce (more) EGR condensate than during normal operation if needed, for instance by: i) operating the EGR cooling device with a high efficiency (by increasing a mass flow of a cooling medium and/or lowering the temperature of the cooling medium), ii) increasing the EGR mass flow (which leads to larger amounts of water in the EGR flow and thus a higher condensate production rate), iii) increasing the fraction of fuel in the air-fuel mixture combusted in the engine so as to produce exhaust gas with a higher concentration of water (e.g. by controlling the air inlet throttle valve to reduce the amount of air), and/or iv) operate the EGR system while the engine is cold (i.e. below normal operation temperature) so that also the exhaust gas is "cold" and easier to condense efficiently.

In an embodiment the step of providing the flushing liquid in the EGR conduit upstream of the EGR gas feeding device comprises the step of: introducing at least part of the flushing liquid into the EGR conduit via a flush liquid channel arranged in fluid communication with a flush liquid tank and the EGR conduit. This is an alternative, or complement, to the step of providing the flushing liquid by condensing EGR directly in the EGR conduit. The liquid contained in the flush liquid tank may be EGR condensate that has been accumulated previously or another liquid, or a mix of EGR condensate and another liquid.

In an embodiment the step of providing the flushing liquid in the EGR conduit is carried out during cold start of the internal combustion engine system. The term "cold start" is a well-established term in the field of internal combustion engines and means in principle all situations where the temperature of the engine is below normal operational temperature, typically when the temperature of the engine cooling medium/water is below a certain level, e.g. 70° C. Determining the rotational friction of the rotary member and, if necessary, flushing/cleaning of the gas feeding device can be used as a routine measure that always is conducted during cold start. Besides that it can be a good routine to always check for and remove soot etc. in the gas feeding device at cold start, the EGR cooler produces more condensate when the engine is cold so if this condensate is used for flushing the gas feeding device it is likely that there is a good supply of flushing liquid during cold start. A routine measure at cold start may alternatively be to carry out flushing/cleaning without a prior determination of the rotational friction of the rotary member or to carry out flushing/cleaning even if the rotational friction is below the threshold.

The step of flushing the gas feeding device with a portion of flushing liquid may also be performed during normal operation of the engine system, i.e. when the engine has reached its normal operational temperature. The engine system may be provided with a low-temperature path or loop for cooling medium to allow for production of larger amounts of condensate also during normal operation of the engine system.

In an embodiment the gas feeding device is configured to feed exhaust gas by means of a displacement pump, preferably a Roots type blower having a pair of rotors provided with meshing lobes. Such a pump is suitable for feeding the exhaust gas but seems to be unreliable in this particular application if not subject to recurrent monitoring of its function and various cleaning actions to remove depositions of soot etc.

According to the second aspect the invention relates to an internal combustion engine system configured to control anyone of the above method steps.

According to a variant of the second aspect the invention relates to a vehicle comprising an internal combustion engine system of the above type.

According to the further aspect the invention relates to:
a computer program product comprising program code means for controlling the steps of the above method when said program product is run on a computer;
a computer readable medium carrying a computer program comprising program code means for controlling the steps of the above method when said program product is run on a computer; and
a control unit for controlling the internal combustion engine system of the above type, the control unit being configured to control the steps of the above method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
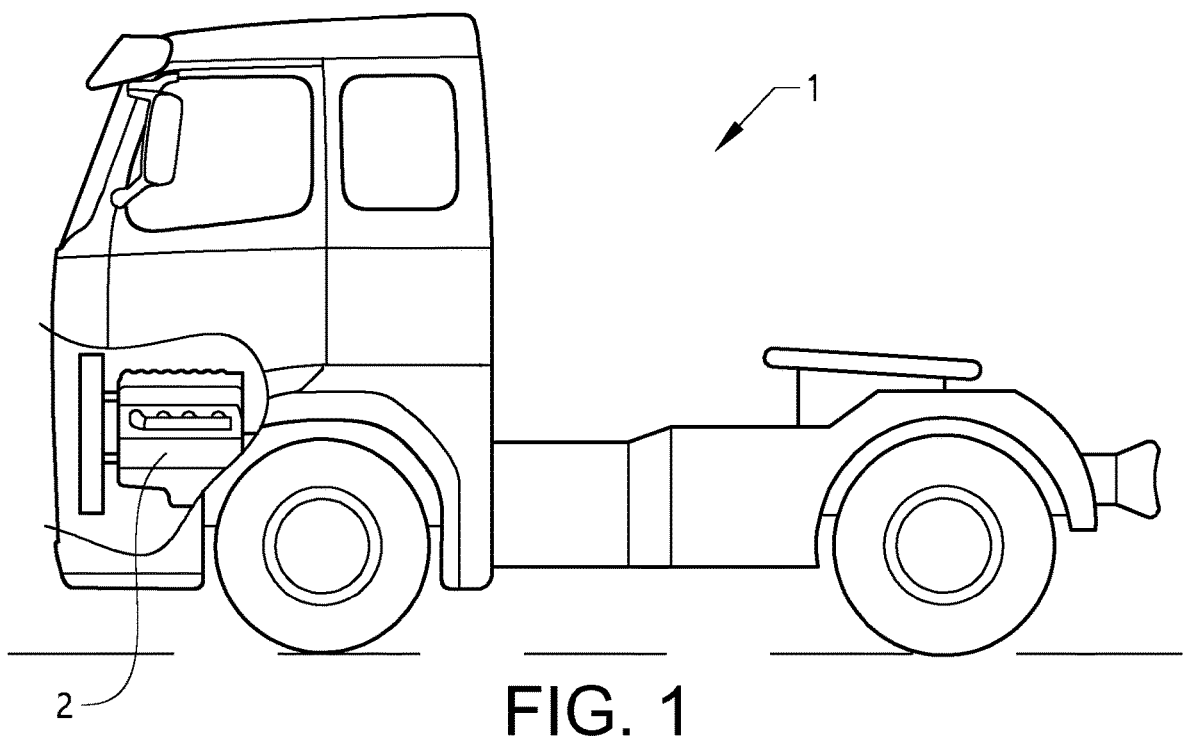
FIG. 1 is a schematic view of a vehicle/truck provided with an internal combustion engine system according to the invention.

FIG. 1 shows a schematic view of a truck 1 provided with an internal combustion engine system 2 according to the invention.

Figure 2:
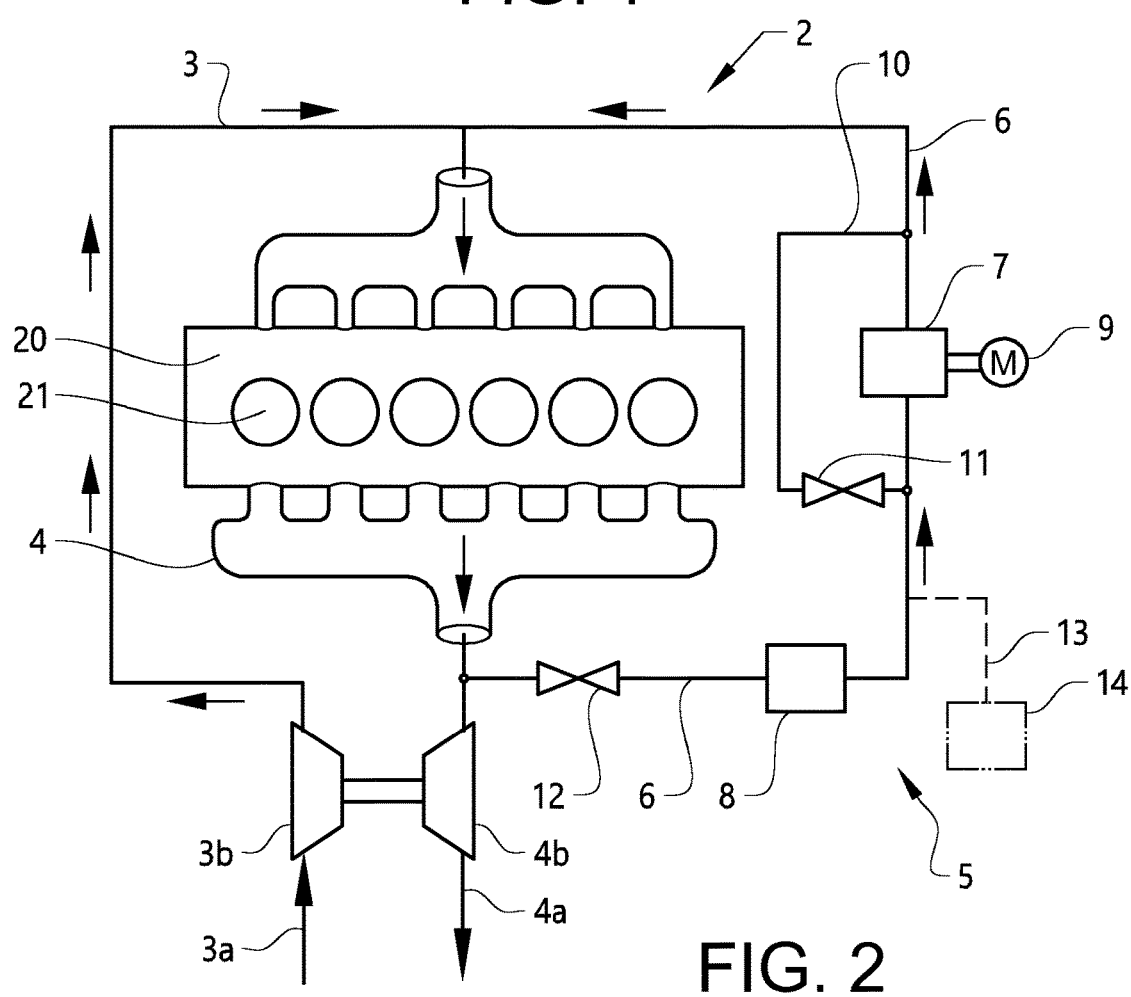
FIG. 2 is a schematic view of the internal combustion engine system according to FIG. 1.

FIG. 2 shows a schematic view of the internal combustion engine system 2 according to FIG. 1. The engine system 2 is provided with an air intake duct 3, an exhaust gas duct 4 and an exhaust gas recirculation (EGR) system 5. Intake air 3a is compressed in a turbo compressor 3b before entering the intake duct 3. Exhaust gas 4a leaves the schematically illustrated engine system 2 after having passed through an exhaust turbine 4b that drives the turbo compressor 3b. The air intake duct 3 guides air to a plurality of cylinders 21 (in this example six) arranged in an engine block 20 and the exhaust duct 4 leads the exhaust gas away from the cylinders 21 and the engine block 20.

In line with conventional engine systems each cylinder 21 is provided with a piston (not shown) as well as intake and exhaust valves (not shown), wherein the pistons are connected to a crankshaft (not shown) further connected to driving wheels of the vehicle 1 via various transmissions (not shown). Fuel supply and exhaust gas aftertreatment equipment is not shown in the figures.

The EGR system 5 comprises an EGR conduit 6 that fluidly connects the exhaust duct 4 and the intake duct 3. To provide for a flow of EGR when the pressure is higher in the intake duct 3 than in the exhaust duct 4 a gas feeding device 7 configured to feed exhaust gas from the exhaust duct 4 to the intake duct 3 is arranged in the EGR conduit 6. The gas feeding device 7 is in this example a Roots type blower (see FIG. 3). A drive motor 9, in this case an electric motor, is arranged to drive the gas feeding device 7, which in this case means that the drive motor 9 is arranged to rotate rotary members 71, 72 of the gas feeding device 7 (see FIG. 3).

The EGR system 5 further comprises: an EGR valve 12 for opening/closing of the EGR conduit 6 (the gas feeding device 7 can also function as EGR valve, see below); an EGR cooling device 8 arranged to allow for cooling of the exhaust gas flowing through the EGR conduit 6; an EGR bypass conduit 10 arranged in fluid communication with the EGR conduit 6 upstream and downstream of the gas feeding device 7 so as to allow for an EGR flow that by-passes the gas feeding device 7; and a bypass valve 11 arranged in the EGR bypass conduit 10.

FIG. 2 further indicates an optional flush liquid channel 13 arranged to fluidly connect an optional flush liquid tank 14 with the EGR conduit 6 upstream of the EGR gas feeding device 7 for introduction of a flushing liquid into the EGR conduit 6. The channel 13 and tank 14 may be used as an alternative or complement to the provision of flushing liquid directly in the EGR conduit 6 by means of condensation as will be described below.

The engine system 2 further comprises a control unit (not shown) configured to control parts and functions of the engine system 2 and to control e.g. all method steps described in this disclosure. The control unit receives information from various sensors (not shown) arranged in the engine system 2. The principle function of control units for controlling operation of internal combustion engines and engine systems is well known in the art.

During normal operation of the engine system 2 the pressure is higher in the intake duct 3 than in the exhaust duct 4, the EGR valve 12 is open, the bypass valve 11 is closed, and the gas feeding device 7 feeds exhaust gas through the EGR conduit 6 from the exhaust duct 4 to the intake duct 3. The gas feeding device 7 can function as an EGR valve by e.g. turning it off and lock it in a stationary (non-rotating) position that substantially prevents through-flow. This is done by controlling the electric drive motor 9. The EGR valve 12 is thus in this example not necessary. When the gas feeding device 7 is turned off and locked, opening of the bypass valve 11 allows for a flow of exhaust gas through the EGR bypass conduit 10. The gas feeding device 7 may be turned off but set in a mode that allows through-flow, i.e. the rotary members 71, 72 of the Roots blower are allowed to rotate.

Figure 3:
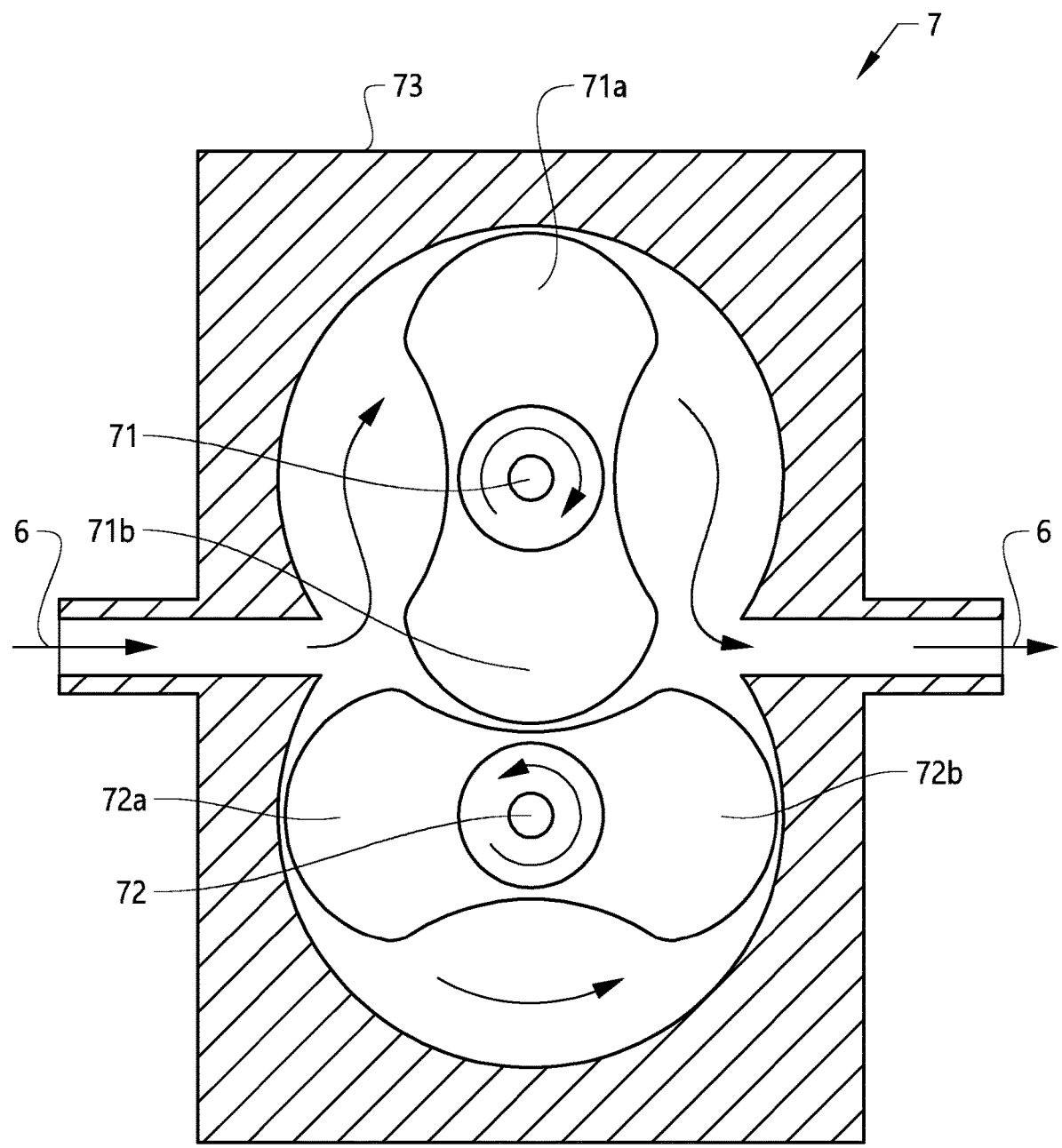
FIG. 3 is a schematic sectional view of a gas feeding device in the form of a Roots type blower.

FIG. 3 shows a schematic view of the gas feeding device 7 arranged in the EGR conduit 6, wherein the gas feeding device 7 is in the form of a Roots type blower having first and second rotary members 71, 72 provided with meshing lobes 71a, 71b, 72a, 72b configured to rotate inside a surrounding housing 73. Roots type blowers are well known as such. In some Roots type blowers each rotary member is provided with more than two lobes. In relation to FIG. 3 an incoming EGR flow in the EGR conduit 6 passes an inlet at the left and is displaced (as indicated by the arrows) by the rotary members 71, 72 to an outlet at the right and further into the EGR conduit 6 downstream of the gas feeding device 7 (towards the intake duct 3 and the cylinders 21 as indicated in FIG. 1).

Figure 4:
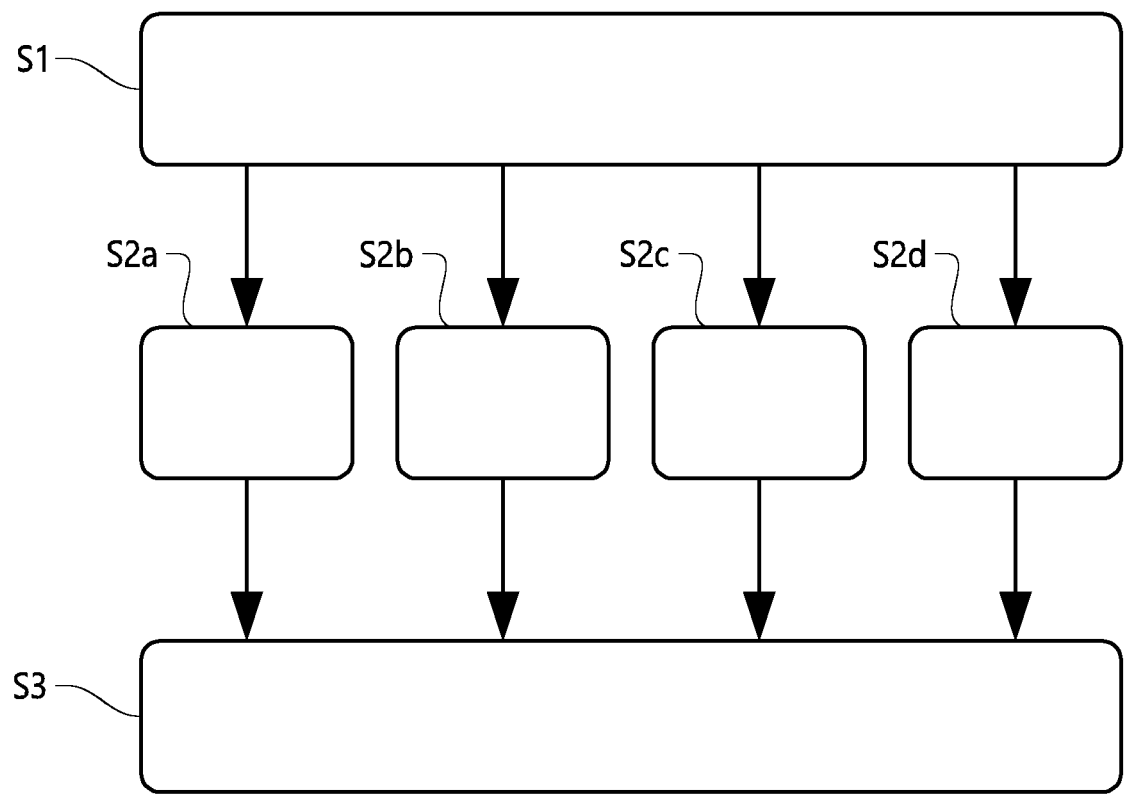
FIG. 4 is a flow diagram for an exemplary embodiment of the inventive method.

FIG. 4 shows a flowchart of an example of a method of operating the internal combustion engine system 2 where an indication of accumulated deposits of soot, hydrocarbons or other contaminants in the gas feeding device 7 is detected by determining whether a rotational friction of the rotary member 71, 72 of the gas feeding device 7 exceeds a threshold value. The example also illustrates which actions may be taken if the threshold value is exceeded and further involves a step of checking whether the actions taken have had the desired effect.

The example of FIG. 4 comprises the steps of:

S1—determining whether a rotational friction of the rotary member 71, 72 of the gas feeding device 7 exceeds a threshold value by measuring a torque applied to the rotary member 71, 72, measuring an actual rotational speed of the rotary member 71, 72, determining the rotational friction of the rotary member 71, 72, and comparing the determined rotational friction with the threshold value;

and, if the threshold value in step S1 is exceeded, at least one of the following steps S2a-S2d:

S2a—operating the rotary member 71, 72 in a reversed rotational direction, opposite to a rotational direction used under normal operational conditions;

S2b—increasing a drive power of the drive motor 9 arranged to drive the gas feeding device 7 and the rotary member 71, 72 to a power level higher than a power level used under normal operational conditions;

S2c—flushing and cleaning the EGR gas feeding device 7 by providing flushing liquid in the form of EGR condensate in the EGR conduit 6 upstream of the EGR gas feeding device 7; and/or S2d—increasing the temperature of the exhaust gas flowing through the gas feeding device 7, followed by S3—repeating step S1 to determine whether the step(s) S2a-S2d has/have had the desired effect of cleaning the gas feeding device 7 so that the rotational friction of the rotary member 71, 72 has been reduced below the threshold value.

What to do after step S3 depends on the outcome of S3:

If it is determined in S3 that the rotational friction has been reduced and falls below the threshold value it can be taken as an indication that the accumulated deposits have been removed, which means that the method S1-S3 can be terminated and that the engine system 2 can return to normal operational conditions (for instance, if the temperature of the exhaust gas or the drive motor power has been increased it can now be decreased to a normal level).

If it is determined in S3 that the rotational friction still exceeds the threshold value one or more of steps S2a-S2d can be carried out again, possibly several times, followed by an additional repetition of step S1 to check whether the rotational friction has decreased below the threshold value. If not, one or more of steps S2a-S2d can be repeated again. If the rotational friction does not fall below the threshold value after a certain number or combination of cleaning operations, the engine system 2 can be controlled to i) turn off and lock the gas feeding device 7, ii) increase, if necessary, the pressure in the exhaust duct 4 (e.g. by using an engine brake as mentioned above), and iii) open the bypass valve 11 so as to guide the flow of exhaust gas in the EGR conduit 6 into and through the bypass conduit 10. Another option in this situation is to close the EGR conduit 6 (by means of the gas feeding device 7 or the EGR valve 12) and operate the engine system 2 without EGR. A further option is to turn off the entire engine system 2.

Determination of the rotational friction of the rotary member 71, 72 of the gas feeding device 7 can be made continuously, which means that steps S1 and S3 do not necessarily have to be separate steps that are started and terminated.

Step S2a may comprise pulsed reversed rotation and alternate directions as described further above.

Step S2b may comprise thresholds for maximum power level and maximum time period for operation at power level higher than normal.

Step S2c is in this example carried out by operating the engine system 2 so that EGR exhaust gas condenses in or downstream the EGR cooling device 8. If EGR condensate is not produced in sufficient amounts in step S2 this step can comprise the action of controlling the engine system 2 to produce more EGR condensate by e.g. increasing the efficiency of the EGR cooling device 8, increasing the mass flow of the exhaust gas flowing through the EGR conduit 6 and/or increasing the fraction of fuel in an air-fuel mixture that is combusted in the internal combustion engine system 2. As an alternative or complement to the provision of a flushing liquid by generating EGR condensate directly in the EGR conduit 6 used in step S2c, it is possible to introduce flushing liquid into the EGR conduit 6 from the flush liquid tank 14 via the flush liquid channel 13. The flush liquid tank 14 may contain previously accumulated EGR condensate or another liquid.

Step S2d may comprise operating the internal combustion engine system 2 in a particular mode and/or reducing the cooling effect of the EGR cooling device 8 as described further above.

For steps S2a-S2b it is not necessary that the actual engine parts of the engine system 2 are in operation since a flow of exhaust gas through the EGR conduit 6 is not required, i.e. it is not necessary that the pistons move, that any air is fed to the cylinders 21, that any exhaust gas is produced, etc. Any EGR flow is not required for step S2c if flushing liquid is taken from the flush liquid tank 14 but the cleaning effect is likely to be small or negligible if there is no flow of exhaust gas that forces the flushing liquid towards and through the gas feeding device 7.

Besides that any of the cleaning steps S2a-S2d can be repeated, two or more of these steps can be carried out in (close) succession and/or be carried out simultaneously.

As to the determination of the rotational friction of the rotary member 71, 72 of the gas feeding device 7 it may comprise one or more of the following steps:

measuring a torque applied to the rotary member 71, 72;

measuring a driving power, such as a drive motor current, of the drive motor 9;

measuring an actual rotational speed of the rotary member 71, 72;

measuring a response time of the rotary member 71, 72 between a change in driving power and a resulting change of rotational speed.

As an example, the rotational friction can be calculated or at least estimated from measurements of the applied torque and the actual rotation speed or from measurements of the driving power and the response time. Which threshold value to choose for the rotational friction depends on the particular application (e.g. on the type and size of the gas feeding device 7).

It is to be understood that the present invention is not limited to the embodiments described above and illustrated in the drawings; rather, the skilled person will recognize that many changes and modifications may be made within the scope of the appended claims.

The invention claimed is:

1. A method for operating an internal combustion engine system, wherein the internal combustion engine system is provided with an air intake duct, an exhaust gas duct and an exhaust gas recirculation (EGR) system, wherein the EGR system comprises an EGR conduit that fluidly connects the exhaust duct and the intake duct, and wherein a gas feeding device configured to feed exhaust gas from the exhaust duct to the intake duct is arranged in the EGR conduit, that the method comprising:

detecting an indication of accumulated deposits of soot, hydrocarbons or other contaminants in the gas feeding device by determining whether a rotational friction of a rotary member of the gas feeding device exceeds a threshold value; and upon the detecting of the indication of accumulated deposits:

operating the rotary member in a reversed rotational direction, opposite to a rotational direction used under normal operational conditions; or increasing a drive power of a drive motor arranged to drive the gas feeding device and the rotary member to a power level higher than a power level used under normal operational conditions; or guiding the flow of exhaust gas in the EGR conduit in a bypass conduit arranged in fluid communication with the EGR conduit upstream and downstream of the gas feeding device; or increasing the temperature of the exhaust gas flowing through the gas feeding device.

2. A method according to claim 1, wherein the determination of the rotational friction comprises one or more of the following steps:

measuring a torque applied to the rotary member, measuring a driving power, such as a drive motor current, of a drive source arranged to drive the gas feeding device and rotate the rotary member, measuring an actual rotational speed of the rotary member, measuring a response time of the rotary member between a change in driving power and a resulting change of rotational speed.

3. A method according to claim 1, wherein when the rotary member is operated in the reversed rotational direction in a pulsed manner during a short period, wherein the pulsed reversed operation is followed by continued operation in the normal operational rotational direction.

4. A method according to claim 3, wherein the short period during which the rotary member is operated in the reversed direction is less than 10 s, preferably less than 5 s.

5. A method according to claim 3, wherein the method comprises the step of:

repeating the step of operating, in a pulsed manner, the rotary member in a reversed rotational direction.

6. A method according to claim 3, wherein the method comprises the step of operating the rotary member in a pulsed manner alternately in the reverse rotational direction and the normal rotational direction.

7. A method according to claim 1, wherein the method comprises the step of:

operating the internal combustion engine system so as to increase the temperature of the exhaust gas and/or reducing a cooling effect of an EGR cooling device arranged in the EGR conduit upstream of the gas feeding device.

8. A method according to claim 1, wherein, in case an indication of accumulated deposits is detected, the method further comprises the step of:

providing a flushing liquid in the EGR conduit upstream of the gas feeding device so as to flush and clean the gas feeding device.

9. A method according to claim 8, wherein the method further comprises the steps of:

condensing exhaust gas in or downstream an EGR cooling device arranged in association with the EGR conduit so as to form an EGR condensate, and using the EGR condensate as the flushing liquid.

10. A method according to claim 8, wherein the step of providing the flushing liquid in the EGR conduit is carried out during cold start of the internal combustion engine system.

11. A method according to claim 1, wherein the gas feeding device is configured to feed exhaust gas by means of a displacement pump, preferably a Roots type blower having a pair of rotors provided with meshing lobes.

12. The internal combustion engine system defined in claim 1, including an electronic control unit configured to perform the method of claim 1.

13. A vehicle comprising the internal combustion engine system according to claim 12.

14. A non-transitory computer readable medium carrying a computer program comprising program code for controlling the steps of claim 1 when said computer program is run on a computer.

* * * * *